United States Patent Office 3,151,913
Patented Oct. 6, 1964

3,151,913
GAS TRAPS
George Howard Forsyth, Grange-over-Sands, England, assignor to Vickers-Armstrongs (Engineers) Limited, London, England, a British company
Filed Aug. 31, 1962, Ser. No. 220,840
Claims priority, application Great Britain, Aug. 7, 1962, 30,196/62
9 Claims. (Cl. 302—36)

This invention relates to gas traps.

According to the present invention there is provided a gas trap arrangement for permitting feed of powdered material from one zone to a further zone, which one zone, in operation, is at a lower pressure than said further zone and at a level above said further zone and for minimising flow of gas to said one zone from said further zone, said arrangement including a first conduit connecting said zones to each other, and a second conduit communicating with the first conduit at a location between said zones, said second conduit extending upwardly from the junction between said conduits to a zone which, in operation, is at a lower pressure than said one zone, the arrangement being such that in use fluidised heads of powdered material build up above said junction, in the first and second conduits, whereby flow of gas from said further zone to said one zone is minimised.

Figure 1:
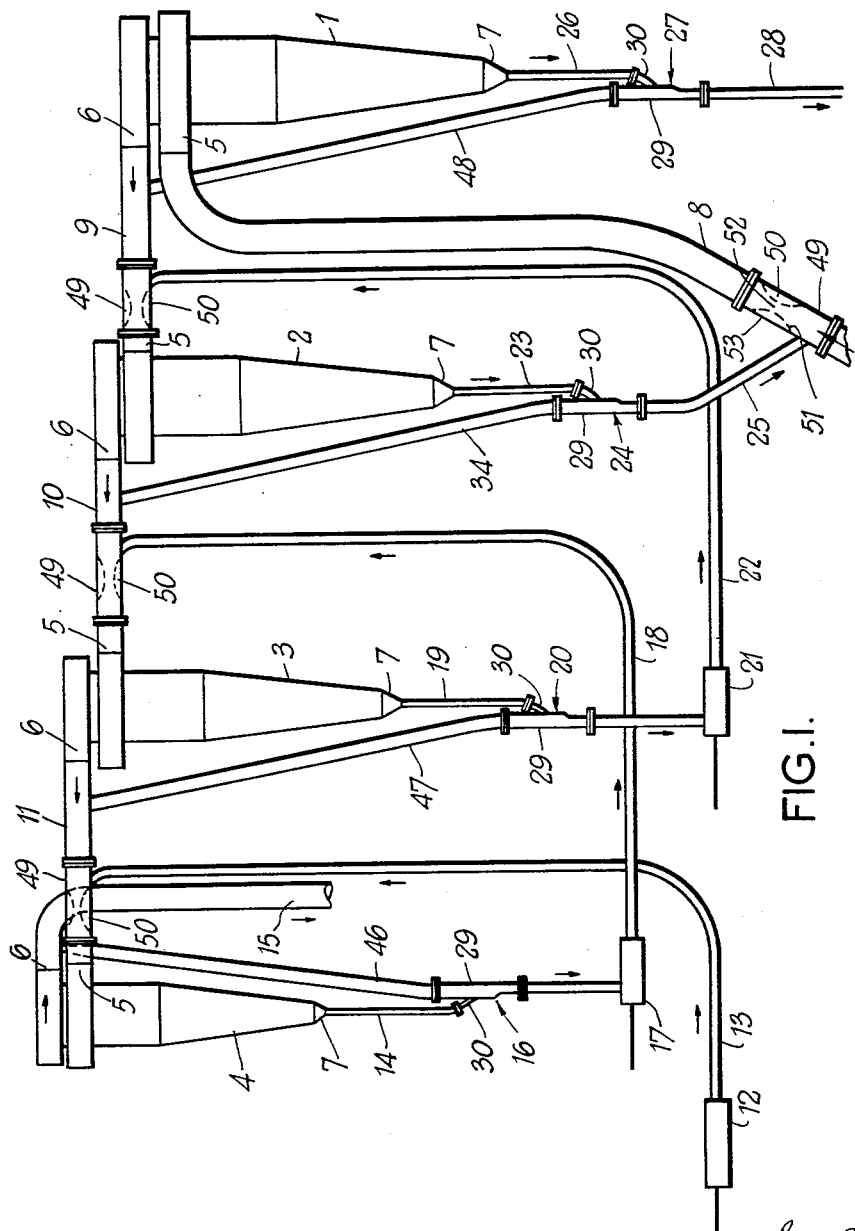
Figure 2:
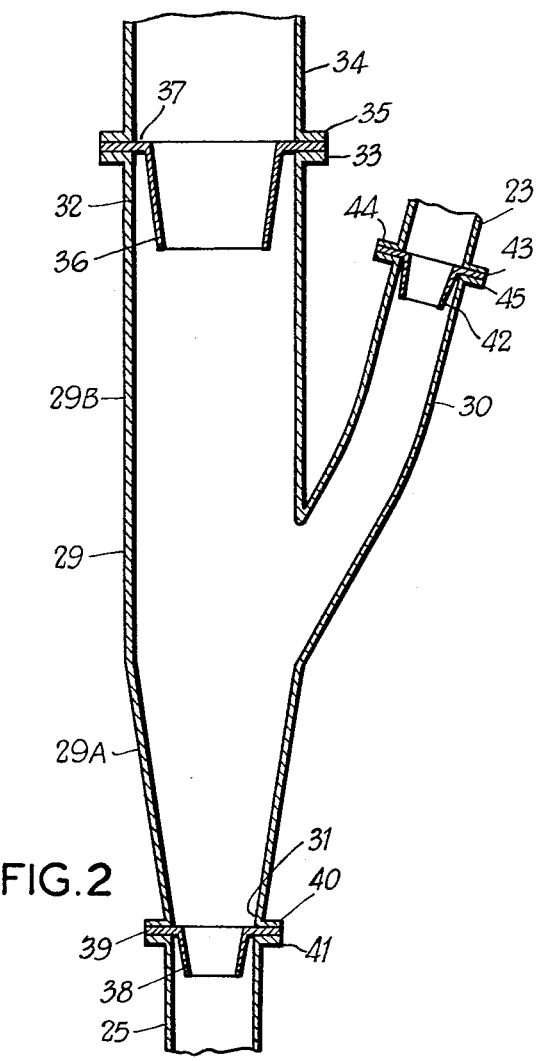

For a better understanding of the invention and to show how the same may be carried into effect reference will now be made by way of example, to the accompanying drawings in which:

FIGURE 1 is a diagram of apparatus for heating powdered material such as raw cement material, and FIGURE 2 is a cross-section, to an enlarged scale, of a detail of the apparatus shown in FIGURE 1.

Referring to FIGURE 1, the heating apparatus includes a plurality of cyclone separators 1, 2, 3 and 4 for separating gases from powdered material. The separators 1 to 4 have their axes vertical and each has a gas inlet at 5, a gas outlet at 6 and an outlet at 7 for the material separated from the gases in the separator. Each separator 1 to 4 has a casing which is of substantially circular cross-section, the gas inlet 5 and the gas outlet 6 of each separator being arranged tangentially with respect to the casing. The gas inlet of the separator 1 is connected by a duct 8 to a stationary flue structure (not shown) of a rotary kiln (not shown). The gas outlet 6 of the separator 1 is connected by a duct 9 to the gas inlet 5 of the separator 2, and the gas outlet 6 of the separator 2 is connected by a duct 10 to the gas inlet 5 of the separator 3. In a similar manner the gas outlet 6 of the separator 3 is connected by a duct 11 to the gas inlet 5 of the separator 4. In use of the apparatus gas flows from the kiln to the separator 1 by way of the duct 8 and then through the separators 2 to 4 by way of the ducts 9, 10 and 11. As will be seen from FIGURE 1 the separators 1 to 4 are arranged side-by-side and the ducts 9, 10 and 11 extend horizontally or substantially horizontally from the gas outlet 6 of one separator to the gas inlet 5 of the next. The gas outlet 6 of the separator 4 is connected to a duct 15. The duct 15 leads to a dust separator (not shown) such as an electrostatic precipitator or a cyclone separator and to a fan (not shown) which serves to draw the hot gases through the apparatus.

A pump 12 for feeding raw powdered material into the apparatus has its delivery side connected to a pipe 13 which opens into the duct 11. The material outlet 7 of the separator 4 is connected to a material discharge pipe 14 and the pipe 14 is connected by way of a gas trap 16 to the intake side of a pump 17. The delivery side of the pump 17 is connected to a pipe 18 which opens into the duct 10 leading to the separator 3. The material outlet 7 of the separator 3 is connected to a material discharge pipe 19 which leads by way of a gas trap 20 to the intake side of a pump 21 and the delivery side of the pump 21 is connected to a pipe 22 which opens into the duct 9 leading to the separator 2. A material discharge pipe 23 of the separator 2 is connected through a gas trap 24 to a pipe 25 which opens into the duct 8 leading from the flue structure of the kiln to the gas inlet 5 of the separator 1. A material discharge pipe 26 of the separator 1 is connected by way of a gas trap 27 to a feed pipe 28 which leads to the rotary kiln. The heating apparatus described above forms the subject of our co-pending Patent Application No. 220,841, filed concurrently herewith.

The ducts 8, 9, 10 and 11 each include a section 49. The interior wall of the section 49 is lined with refractory material which is locally thickened at 50 (see the section 49 of the duct 8) thereby to form in the bore of the section a convergent portion 51 leading to a throat 52 which is followed by a divergent portion 53. This convergent-divergent arrangement, is provided for improving heat transfer between the gas and the material.

The gas trap 24 is of the same construction as the traps 16, 20 and 27 and serves to allow material to be transferred from a zone which, in use of the apparatus, is at a lower pressure than the zone to which the material is transferred while minimising gas flow from the high pressure zone to the low pressure zone. The trap 25 is shown in more detail in FIGURE 2 and includes a branch pipe 30 which enters a vertical pipe 29 at a location intermediate the ends of the pipe 29. The part 29A of the pipe 29 below the junction with the pipe 30 is tapered so that the lower end 31 of the pipe 29 is of smaller cross-sectional area than the upper end 32 of the pipe 29. The upper end of the branch pipe 30 is connected to the material discharge pipe 23 of the separator 2, the branch pipe 30 having a smaller cross-sectional area than the lower end 31 of the pipe 29. The upper end of the pipe 29 has a radially outwardly directed flange 33, and the lower end of a pipe 34 (see also FIGURE 1) having the same cross-sectional area as the upper end 32 of the pipe 29 has an outwardly directed flange 35 thereon. The pipe 34, the parts 29A and 29B of the pipe 29, and the pipe 25 constituting a first conduit connecting the duct 10 to the duct 8. The pipes 23 and 30 constitute a second conduit which connects the first conduit with the interior of separator 2. A nozzle 36 of hollow open-ended frustro-conical form has a radially outwardly directed flange 337 on the larger diameter end thereof. The nozzle 36 is disposed coaxially of the pipes 29 and 34 with the larger diameter end thereof uppermost and the flange 37 thereof is clamped between the flanges 33 and 35 on the pipes 29 and 34 respectively. The pipe 29 and the branch pipe 30 are integral with one another. The lower part 29A of the pipe 29 constitutes the section of the first conduit which is immediately below the junction with the second conduit, the pipe 30 constitutes the section of the second conduit which is immediately above the junction, and the upper part 29B of the pipe 29 constitutes the section of the first conduit immediately above the junction with the second conduit, these three sections being releasably secured to the remainder of the first and second conduits.

A similar arrangement is provided at the lower end of the pipe 29, a hollow open-ended frusto-conical nozzle 38 being clamped by means of its flange 39 between a flange 40 on the lower end of the pipe 29 and a corresponding flange 41 on the upper end of the pipe 25. At the upper end of the branch pipe 30 a hollow open-ended frusto-conical nozzle 42 is clamped by means of its flange 43 between a flange 44 on the lower end of the pipe 23 and a flange 45 on the upper end of the pipe 30. The nozzles are all downwardly convergent.

It will be understood that in use of the apparatus different pressures prevail in different parts of the apparatus. The gas in the duct 8 to which the lower end of the pipe 25 is connected is at a higher pressure than are the gases in the separator 2 to which the upper end of the pipe 23 is connected and are also at a higher pressure than the gases in the duct 6 to which the upper end of the pipe 34 is connected. Furthermore, the pressure prevailing in the separator 2 is greater than that prevailing in the duct 6. The result of these pressure differences is that in use of the apparatus gases tend to flow from the pipe 23 and the pipe 25 to the pipe 34 via the upper end of the pipe 29. When powdered material is discharged from the separator 2 it enters the trap 24 by way of the pipe 23. The flow of gases from the pipes 23 and 25 to the pipe 34 carries some powdered material from the pipe 30 to the pipe 34 and heads of fluidised powdered material build up in the lower end of the pipe 34, in the pipe 29 and in the pipe 30. The heads of fluidised material substantially balance the differences in pressure between the duct 8, the duct 6 and separator 1 whereby upward flow of gases is reduced to the small amount necessary to maintain the particles of powder in suspension. When further material flows under gravity from the separator 2 down the pipe 30 an equivalent amount of material flows down the pipe 25 to the duct 8. To provide pressure differences similar to those existing at the trap 24 in the traps 16, 20 and 27 so that these traps operate in a similar manner to the trap 24, the upper end of the pipes 29 of these traps are connected with the ducts 15, 11 and 9 respectively by pipes 46, 47 and 48 respectively.

In use of the apparatus described above, hot waste gases from the kiln are drawn from the kiln through the duct 8 to the gas inlet 5 of the separator 1. The tangential arrangement of the inlet 5 causes the gases to be set into whirling motion as they enter the separator 1. The gases upon passing out of the separator 1 enter the duct 9 and are conveyed to the separator 2. It will be understood that the gases then pass in turn through the separators 2, 3 and 4 by way of the ducts 10 and 11 to the outlet duct 15.

The material to be heated is fed by the pump 12 from a supply (not shown) of material and is lifted by the pump 12 from the level at which the pump is disposed to the level of the duct 11. The material entering the duct 11 is entrained by the gases passing along the duct 11 and carried through the section 49, the gases and the material then entering the separator 4. The convergent-divergent section 49 in the duct 6 causes the speed of the gases to vary relative to the speed of the powdered material and heat is transferred from the gases to the material. The material and the gases are separated one from the other in the separator 4. The material is discharged from the separator 4 through the pipe 14 to the trap 16. The trap 16 operates in a similar manner to the trap 24. The material then passes to the intake side of the pump 17 and is lifted by the pump 17 through the pipe 18 to the level of the duct 10. It will be understood that the gases passing through the duct 10 entrain the material and carry it into the separator 3, by way of the section 49 in which further heat transfer from the gas to the powdered material takes place. The material is then separated from the gases once more and passes through the pipe 19 via the trap 20 to the pump 21 and is then lifted along the pipe 22 to the level of the duct 9. Material is then carried into the separator 2 via the section 49 by gases passing along the duct 9, the gases still further heating the material. The gases and material are separated in the separator 2, the material being passed from the separator 2 via the pipe 23, the trap 24 and the pipe 25 to the duct 8. The hot gases passing along the duct 8 directly from the kiln carry the material upwardly into the separator 1 by way of the section 49 of the duct 8 and more heat is transferred to the powdered material. The material discharged from the lower end of the separator 1 passes through the trap 27 and the pipe 28 and enters the kiln.

I claim:
1. A gas trap arrangement comprising:
   (a) means defining an intermediate pressure zone;
   (b) means for feeding powdered material into said intermediate pressure zone;
   (c) means defining a high pressure zone having a pressure therein higher than the pressure in said intermediate zone, said high pressure zone being positioned at a lower level than the intermediate pressure zone and arranged to receive powdered material fed therefrom;
   (d) means defining a low pressure zone having a pressure lower than the pressure of said intermediate zone, said low pressure zone being positioned at a higher level than said high pressure zone;
   (e) a first conduit connecting said low pressure zone to said high pressure zone and having a part thereof extending substantially vertical;
   (f) a second conduit connected into the first conduit in its substantially vertically extending part at a location between the low and high pressure zone; and
   (g) said second conduit leading to and connected into the intermediate pressure zone with a part thereof immediately above said location extending upwardly from its connection with the vertically extending part of the first conduit at said location whereby gases which are bled away from the intermediate pressure zone gases are fed upwardly along with the gases in the first conduit flowing from the high pressure zone to the low pressure zone, and the powdered material flowing from the intermediate zone in the second conduit, flows downwardly against the flow of the high pressure gases in the first conduit into the high pressure zone when the head of the fluidized powdered material at least balances the differential in pressure between the high and low pressure zones.

2. An arrangement according to claim 1, wherein the first conduit above its connection with the second conduit is of greater cross-sectional area than it is immediately below its connection with the second conduit.

3. A gas trap arrangement comprising:
   (a) means defining an intermediate pressure zone;
   (b) means for feeding powdered material into said intermediate pressure zone;
   (c) means defining a high pressure zone having a pressure therein higher than the pressure in said intermediate zone, said high pressure zone being positioned at a lower level than the intermediate pressure zone and arranged to receive powdered material fed therefrom;
   (d) means defining a low pressure zone having a pressure lower than the pressure of said intermediate zone; said low pressure zone being positioned at a higher level than said high pressure zone;
   (e) a first conduit connecting said low pressure zone to said high pressure zone and having a part thereof extending substantially vertical;
   (f) a second conduit connected into the first conduit in its substantially vertically extending part at a location between the low and the high pressure zone;
   (g) said second conduit leading to and connected into the intermediate pressure zone with a part thereof immediately above said location extending upwardly from its connection with the vertically extending part of the first conduit at said location whereby gases which are bled away from the intermediate pressure zone gases are fed upwardly along with the gases in the first conduit flowing from the high pressure zone to the low pressure zone, and the powdered material flowing from the intermediate zone in the second conduit, flows downwardly against the flow of the high pressure gases in the first conduit into the high pressure zone when the head of the fluidized powdered material at least balances the differential in pressure between the high and low pressure zones;

(h) said first conduit having a greater cross sectional area immediately above its connection with said said second conduit than its cross sectional area immediately below its connection with said second conduit; and (i) said second conduit having a smaller cross sectional area immediately above its connection with the first conduit than the cross sectional area of the first conduit immediately below its connection with the second conduit.

4. A gas trap arrangement comprising:
(a) means defining an intermediate pressure zone;
(b) means for feeding powdered material into said intermediate pressure zone;
(c) means defining a high pressure zone having a pressure therein higher than the pressure in said intermediate zone, said high pressure zone being positioned at a lower level than the intermediate pressure zone and arranged to receive powdered material fed therefrom;
(d) means defining a low pressure zone having a pressure lower than the pressure of said intermediate zone, said low pressure zone being positioned at a higher level than said high pressure zone;
(e) a first conduit connecting said low pressure zone to said high pressure zone and having a part thereof extending substantially vertical;
(f) a second conduit connected into the first conduit in its substantially vertically extending part at a location between the low and the high pressure zone;
(g) said second conduit leading to and connected into the intermediate pressure zone with a part thereof immediately above said location extending upwardly from its connection with the vertically extending part of the first conduit at said location whereby gases which are bled away from the intermediate pressure zone gases are fed upwardly along with the gases in the first conduit flowing from the high pressure zone to the low pressure zone, and the powdered material flowing from the intermediate zone in the second conduit, flows downwardly against the flow of the high pressure gases in the first conduit into the high pressure zone when the head of the fluidized powdered material at least balances the diffeerntial in pressure between the high and low pressure zones; and
(h) replaceable nozzles provided in flow paths of said first and second conduits, said nozzles being of hollow open-ended frusto-conical form.

5. An arrangement according to claim 4, wherein said nozzles are downwardly convergent.

6. A gas trap arrangement comprising:
(a) means defining an intermediate pressure zone;
(b) means for feeding powdered material into said intermediate pressure zone;
(c) means defining a high pressure zone having a pressure therein higher than the pressure in said intermediate zone, said high pressure zone being positioned at a lower level than the intermediate pressure zone and arranged to receive powdered material fed therefrom;
(d) means defining a low pressure zone having a pressure lower than the pressure of said intermediate zone, said low pressure zone being positioned at a higher level than said high pressure zone;
(e) a first conduit connecting said low pressure zone to said high pressure zone and having a part thereof extending substantially vertical;
(f) a second conduit connected into the first conduit in its substantially vertically extending part at a location between the low and the high pressure zone;
(g) said second conduit leading to and connected into the intermediate pressure zone with a part thereof immediately above said location extending upwardly from its connection with the vertically extending part of the first conduit at said location whereby gases which are bled away from the intermediate pressure zone gases are fed upwardly along with the gases in the first conduit flowing from the high pressure zone to the low pressure zone, and the powdered material flowing from the intermediate zone in the second conduit, flows downwardly against the flow of the high pressure gases in the first conduit into the high pressure zone when the head of the fluidized powdered material at least balances the differential in pressure between the high and low pressure zones; and
(h) said first conduit including a section in said part releasably secured therein, said section extending above and below the connection between said first and second conduits, and said second conduit including a section in its upwardly extending part releasably secured therein, the section of the second conduit joining the section of the first conduit.

7. An arrangement according to claim 6, wherein replaceable nozzles are provided in the flow paths of the conduits, said nozzles being provided at each end of said section of the first conduit, and where said section of the second conduit is releasably connected in the second conduit, the nozzles being of hollow, open-ended frusto-conical form.

8. An arrangement according to claim 7, wherein each nozzle has an outwardly directed flange clamped between the adjacent section and the remainder of the conduit.

9. An arrangement according to claim 8, wherein said nozzles are downwardly convergent.

References Cited in the file of this patent
UNITED STATES PATENTS

| | | |
|---|---|---|
| 658,494 | Watters | Sept. 26, 1900 |
| 2,391,863 | Bowen | Jan. 1, 1946 |
| 2,757,921 | Petersen | Aug. 7, 1956 |